Sept. 19, 1961 N. HACK ET AL 3,000,421
RESILIENT TIRE TREAD

Filed March 9, 1959 3 Sheets-Sheet 1

INVENTORS
NATHAN HACK,
MORTON HACK &
LEONARD HACK
BY
ATTORNEY

Sept. 19, 1961   N. HACK ET AL   3,000,421
RESILIENT TIRE TREAD
Filed March 9, 1959   3 Sheets-Sheet 2
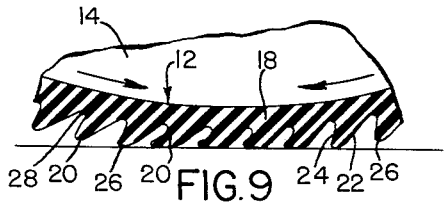
FIG. 9
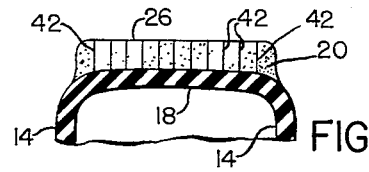
FIG. 11
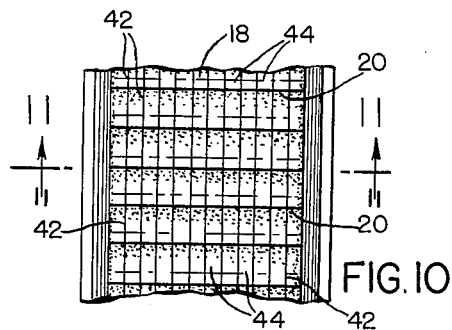
FIG. 10
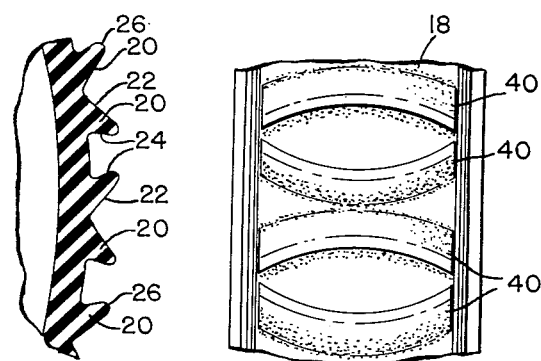
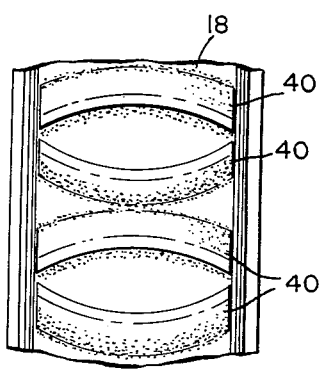
FIG. 13   FIG. 14
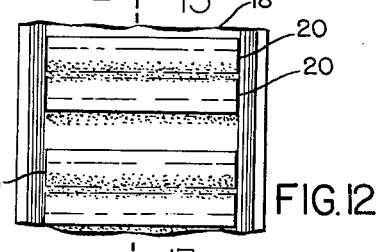
FIG. 12
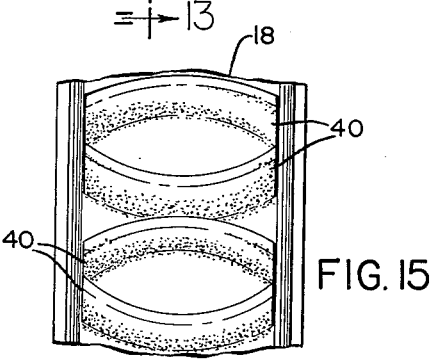
FIG. 15
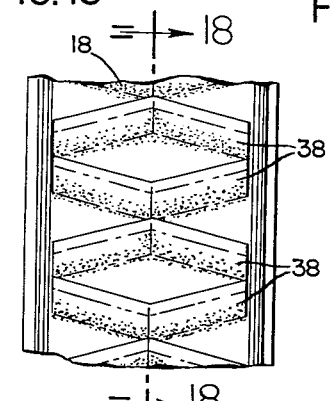
FIG. 16
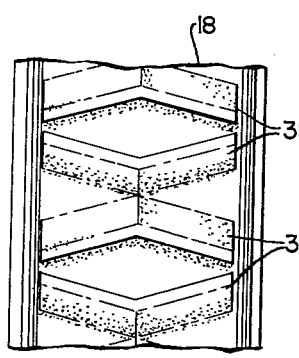
FIG. 17
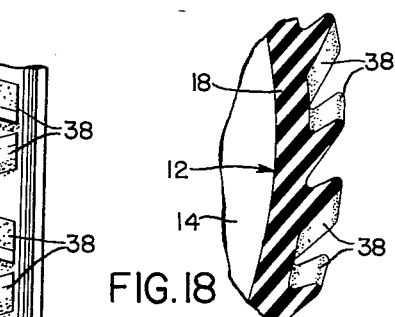
FIG. 18
INVENTORS
NATHAN HACK,
MORTON HACK &
LEONARD HACK
BY
ATTORNEY

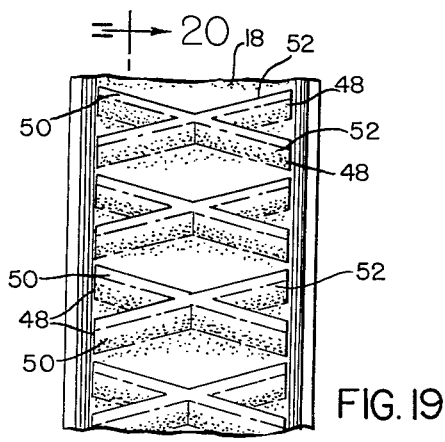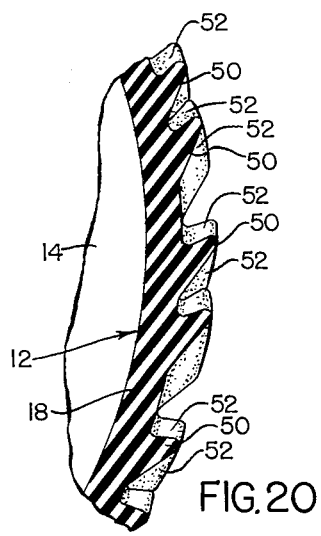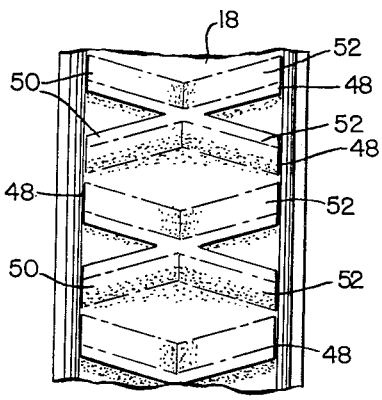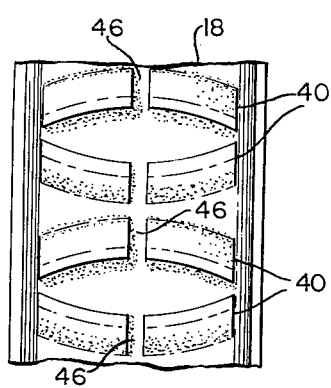

United States Patent Office 3,000,421
Patented Sept. 19, 1961

3,000,421
RESILIENT TIRE TREAD
Nathan Hack, 537 San Vincente Blvd., Santa Monica, Calif., and Morton Hack, 18262 Warrington Drive, and Leonard Hack, 19924 Canterbury, both of Detroit, Mich.
Filed Mar. 9, 1959, Ser. No. 798,253
16 Claims. (Cl. 152—209)

This invention pertains to a resilient tire tread and more particularly to a tire tread having a series of resilient parallel rib members extending substantially radially from the body of the tire on the peripheral wall thereof.

The invention involves a tire having a body and a series of resilient parallel rib members disposed transversely of the peripheral wall of the tire. The rib members are arranged with their front and rear faces at an inclination, in the same direction, to a line tangent at the peripheral wall of the tire. The outer edges of the rib members are preferably rounded, although the edges may also be square, and the front and rear faces of adjacent rib members form a rounded or, optionally, a square juncture with the peripheral wall of the tire. The rib members flex in the direction of inclination, under load, irrespective of the direction of tire rotation.

The rib members may be arranged as straight transverse ribs, curved transverse ribs, straight angular or chevron ribs. The cross-sectional configuration of the rib members in any arrangement, however, is the same.

It is believed that the advantages of the tire tread construction heredisclosed appear to lie in improved traction and cushioning and in improved non-skid values. The tread rib members are so constructed that in flexing they will add traction value to the tire while cushioning the wheel against road shock. In addition, the tread rib members will absorb within themselves a large measure of energy when flexed under load, which energy is releasable in a forward drive of the tire.

It is believed that the tire tread construction heredisclosed has many advantages in its application in tires for airplanes where landing shock is of very great concern. The tire tread ribs of this invention would appear to absorb a considerable amount of the shock of landing airplanes as the tires strike the runway, by virtue of the resilient flexing of the rib members when engaged with the ground plane surface. In addition, the aircooling feature of these rib members reduces the amount of heat expansion generated by severe landing and running shocks, tending to prevent explosion of the tires. The rib members in their flexing grip upon the ground plane surface would further tend to safeguard planes landing on slippery, wet and/or frozen runways.

It is an object of the invention to provide a tire tread having a series of resilient parallel rib members disposed transversely of the peripheral wall of the tire. Another object is the provision of rib members which flex independently of each other under load. Yet another object is to provide rib members having their front and rear faces at an inclination, to a line tangent at the peripheral wall of the tire. Still another object is the provision of rib members having a rounded or, optionally, a square conjunction with the body of the tire.

The tire and tread, as hereindisclosed, is designed to be integrally molded or fabricated according to current practices in the tire fabricating industry, of resilient materials such as rubber, flexible plastic compositions, or any other suitable composition providing a resilient flexible tire tread.

These and additional objects of the invention and features of construction will become more readily apparent from the description given below in which the terms used are employed for purposes of description and not of limitation.

Reference is now made to the drawings annexed hereto, forming an integral part of this specification, and in which FIG. 1 is a side elevational view of a tire embodying the inventive construction.

FIG. 9 is a fragmentary vertical sectional view through the tire tread showing the transverse rib members of FIG. 1 under compression.

FIGS. 10, 12, 14, 15, 16, 17, 19, 21 and 22 are fragmentary front elevational views of further modifications of the tire tread of this invention.

FIG. 11 is a fragmentary vertical sectional view taken substantially on the line 11—11 of FIG. 10.

FIG. 13 is a fragmentary vertical sectional view taken substantially on the line 13—13 of FIG. 12.

FIG. 18 is a fragmentary vertical sectional view taken substantially on the line 18—18 of FIG. 16.

FIG. 20 is a fragmentary vertical sectional view taken substantially on the line 20—20 of FIG. 19.

Figure 1:
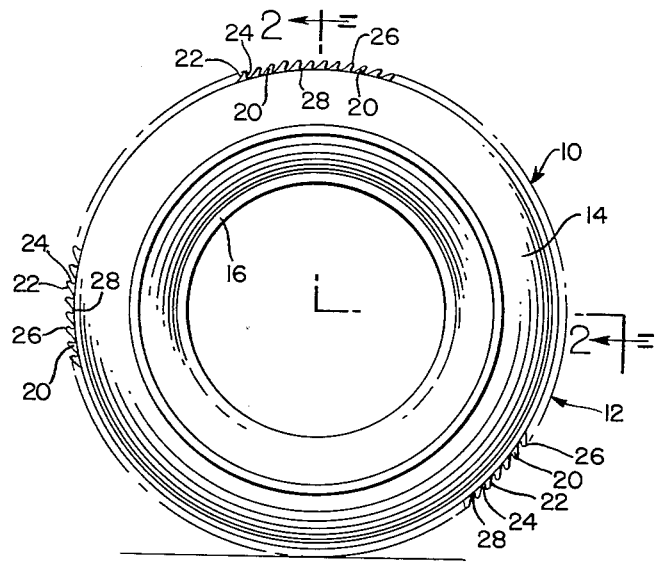

As shown in the several views of the drawings and more particularly in FIGS. 1, 2, 3 and 9, the tire 10 comprises a body 12 having side walls 14, 14 terminating inwardly in beads 16, 16 and conjoined by an outer peripheral tread web or tread surface 18. The tire body may be formed with fabric threads, metal wire and other conventional elements according to current practices.

Figure 2:
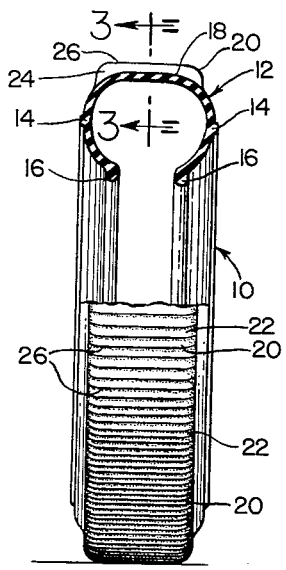
FIG. 2 is a front elevational view, partially in section, taken substantially on the line 2—2 of FIG. 1.
Figure 3:
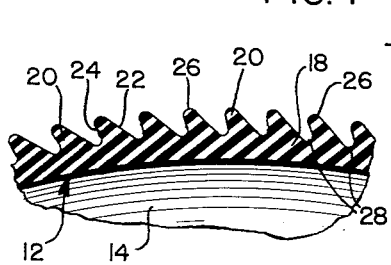
FIG. 3 is a fragmentary vertical sectional view taken substantially on the line 3—3 of FIG. 2.

In FIGS. 1, 2 and 3 the outer peripheral tread surface 18 is provided with a series of transverse rib members 20 disposed circumferentially about the surface in an endless series. The rib members 20 have front faces 22 and rear faces 24 inclined in the same general direction at an angle to a line drawn tangent to the outer peripheral surface. The faces 22 and 24 converge to a rounded edge 26, which is preferable, and diverge from the edge 26 to a rounded juncture 28 with the surface 18. The outer edges of rib members 20 may also be square, if desired, and the juncture of the faces 22 and 24 of adjacent rib members at the surface 18 may be square instead of rounded.

The rib members 20 flex in the direction of their inclination, whether the tire 10 is rotating clockwise or counterclockwise. As seen more clearly in FIGS. 1 and 9, the rib members 20, when in clockwise rotation, will first present the edges 26 to the ground plane causing the members 20 to flex downwardly to the right, i.e. in the direction of inclination. At the same time, the rib member edges 20 will tend to bear more positively upon the ground plane, with a larger amount of land contact, increasing the amount of traction with which the tire engages the ground plane. Upon flexing, the rib members 20 also will tend to absorb a large amount of the shock of ground contact, releasing their absorbed energy by an impelling movement as the resilient rib members unflex.

When the tire in FIG. 1 rotates counterclockwise, the rib members 20 again will flex in the direction of their inclination, presenting the edges 26 so that a large area of face 22 is in contact with the ground plane. At the same time as increased frictional engagement with the ground plane occurs, the flexing of the rib members also cushions the shock of contact, and as the rib members unflex an impelling motion in the direction of rotation is imparted to the tire by the rib members.

Figure 4:
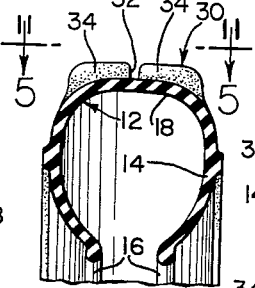
FIG. 4 is an enlarged fragmentary vertical sectional view of a modification of the tire tread shown in FIG. 2.
Figure 5:
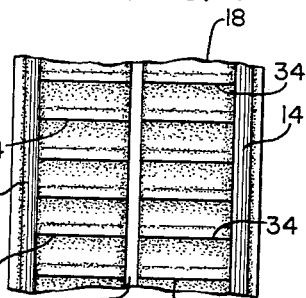
FIG. 5 is a fragmentary front elevational view taken substantially on the line 5—5 of FIG. 4.

Some slight modifications of the rib members 20 are shown in FIGS. 4, 5, 6, 7 and 8 of the drawings. In FIGS. 4 and 5, the straight transverse rib members 30 are shown divided by an annular groove 32 into spaced transverse rib sections 34, 34 arranged in alignment, or optionally in staggered arrangement (not shown), radially about the outer peripheral surface 18.

Figure 6:
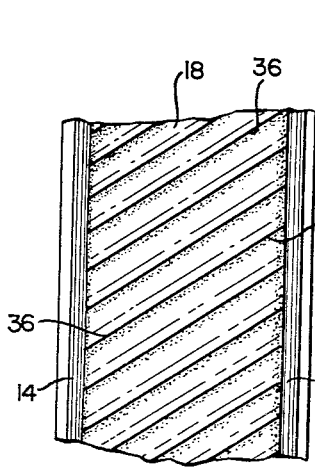
FIGS. 6, 7 and 8 are fragmentary views which show modified tire tread arrangements in front elevation.
Figure 7:
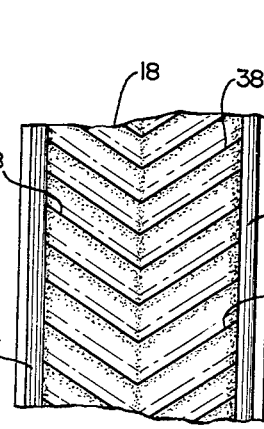
Figure 8:
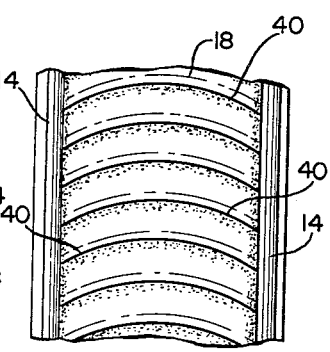

In FIG. 6 is shown straight transverse rib members 36 arranged at an angle across the face of the outer surface 18. In FIG. 7 is shown a chevron rib arrangement, the rib members 38 being disposed transversely of the outer surface 18. And in FIG. 8 are shown rib members 40 which are curved transversely of the outer surface 18. In each instance, the modified rib members have the cross-sectional configuration shown in FIG. 3, and function as do the rib members 20 in both flexure and traction when engaged upon the ground plane. Although not shown in the drawing figures, the modified rib members 36, 38 and 40 of FIGS. 6, 7 and 8, respectively, may also be provided with an annular groove dividing the rib members 36 and 40 into aligned segments, and the rib members 38 into angular aligned rib segments directed toward each other or in staggered relationship to each other on either side of the groove.

The straight transverse ribs 20 may also be constructed, as shown in FIGS. 10 and 11, with parallel slits 42 that cut through the body of each rib member down to the tread surface 18 forming flexing, rib sections or elements 44. The slits 42 will tend to impart increased flexibility in the elements 44 of rib members 20.

In the remaining views of the drawings are shown several combination arrangements of the tread rib members shown in FIGS. 4–8 inclusive. For instance, in FIGS. 12 and 13 the rib members 20 are shown in opposed relationship to each other, the rib members having diverging, rather than parallel, planes of inclination. Similarly, in FIG. 14 are shown rib members 40 arranged in opposed relationship to each other, with converging planes of inclination. And in FIG. 22, rib members 40, similarly arranged in opposed relationship to each other, are split by medial notches 46.

In FIG. 15 are shown rib members 40 having parallel planes of inclination, but adjacent rib members are opposedly curved with respect to each other.

FIGS. 16, 17 and 18 show chevron type rib members 38 arranged in opposed relationship to each other, the rib members 38 in FIGS. 16 and 18 having parallel planes of inclination, and the rib members 38 in FIG. 17 having converging planes of inclination.

The X-type rib arrangements of FIGS. 19, 20 and 21 are but further modifications of the chevron type rib members. In these views, the rib members 48 comprise side elements 50 and 52, being the left and right elements respectively of the rib members. In FIGS. 19 and 20, the rib elements 50 and 52 have parallel planes of inclination. In FIG. 21, the rib elements 50 and 52 have converging planes of inclination.

Although medially split rib members are shown only in FIGS. 4, 5 and 22, it will be understood that each and every one of the rib members here disclosed may be similarly arranged with medial annular notches or grooves. In addition, the parallel slits 42 embodied in rib members 20 shown in FIGS. 10 and 11 may also be employed in the various rib member arrangements shown in FIGS. 5, 6, 7, 8, 12, 14, 15, 16, 17, 19, 21 and 22.

Another advantage which it is believed the invention tends to provide is a large amount of aircooled outer surface on the rib members that project from the outer peripheral surface 18. Through such aircooling, the functional life of the tire tread will be increased and rendered more satisfactory.

Having described the invention in its simplest terms, it is to be understood that the features of construction may be changed and varied in greater or lesser degree without departing from the essence of the invention defined in the appended claims.

We claim:

1. In a tire tread formed of resilient material, an outer annular tread surface having an endless series of spaced transverse ground plane contacting rib members formed integrally with and extending outwardly of said tread surface, said rib members being independent of each other and inclined at an angle to said tread surface, said tread surface having a continuous series of alternating rib members and grooves therebetween, each of said rib members further having its front and rear faces diverging at an acute angle from an outer edge to a conjunction with said tread surface, and said rib members being spaced a sufficient distance from each other that when said tire tread is in rotation and said rib members are engaged with a ground plane surface they will flex independently and out of contact with each other under load in one direction, and thus produce a movement of said tire tread relative to said ground plane surface in the opposite direction.

2. In a tire tread formed of resilient material, an outer annular tread surface having an endless series of spaced transverse ground plane contacting rib members extending outwardly of said tread surface, said rib members being independent of each other and inclined at an angle to said tread surface, said tread surface having a continuous series of alternating rib members and grooves therebetween, each of said rib members further having its front and rear faces diverging at an acute angle from an outer edge to a conjunction with said tread surface, and said rib members being spaced a sufficient distance from each other that when said tire tread is in rotation and said rib members are engaged with a ground plane surface they will flex independently and out of contact with each other under load in one direction, and thus produce a movement of said tire tread relative to said ground plane surface in the opposite direction.

3. In a tire tread formed of resilient material, an outer annular tread surface having an endless series of spaced transverse ground plane contacting rib members extending outwardly of said tread surface, said rib members being independent of each other and inclined in the same direction and at an angle to said tread surface, said tread surface having a continuous series of alternating rib members and grooves therebetween, each of said rib members further having its front and rear faces diverging at an acute angle from an outer edge to a conjunction with said tread surface, and said rib members being spaced a sufficient distance from each other that when said tire tread is in rotation and said rib members are engaged with a ground plane surface they will flex independently and out of contact with each other under load in one direction, and thus produce a movement of said tire tread relative to said ground plane surface in the opposite direction.

4. In a tire tread formed of resilient material, an outer annular tread surface having an endless series of spaced transverse ground plane contacting doublet rib members extending outwardly of said tread surface, said rib members being arranged in doublet pairs, each said pair of said rib members being independent of next adjacent doublet pairs, said rib members being inclined in the same direction and at an angle to said tread surface, said tread surface having a continuing series of alternating rib members and grooves therebetween, each of said rib members further having its front and rear faces diverging at an acute angle from an outer edge to a conjunction with said tread surface, and said doublet pairs being spaced a sufficient distance from each other that when said tire tread is in rotation and said rib members are engaged with a ground plane surface said rib members will flex independently and out of contact with each other under load in one direction, and thus produce a movement of said tire tread relative to said ground plane surface in the opposite direction.

5. The construction defined in claim 4, and in which each rib member in a doublet pair is curved in opposed relationship to the other rib member of said pair.

6. The construction defined in claim 4, and in which each rib member in a doublet pair is chevron shaped and in opposed relationship to the other rib member of said pair.

7. The construction defined in claim 4, and in which each said doublet pair of said rib members comprises two rib members criss-crossed and conjoined, and forming an X-pattern transversely of said tread surface.

8. The construction defined in claim 4, and in which each said doublet pair of said rib members comprises two rib members each provided with a medial notch forming an annular groove about said tread surface.

9. The construction defined in claim 4, and in which each said doublet pair of said rib members comprises two rib members each provided with parallel, aligned slits through said rib members and spaced transversely across from one side of said tread surface to the other, and forming a series of parallel, contiguous, independently flexible elements in each of said rib members.

10. In a tire tread formed of resilient material, an outer annular tread surface having an endless series of spaced transverse ground plane contacting doublet rib members extending outwardly of said tread surface, said rib members being arranged in doublet pairs, each said pair of said rib members being independent of next adjacent doublet pairs, each of said rib members in each said doublet pair being inclined in opposed relationship to the other rib member of said doublet pair, each said rib member being inclined at an angle to said tread surface, said tread surface having a continuing series of alternating rib members and grooves therebetween, each of said rib members further having its front and rear faces diverging at an acute angle from an outer edge to a conjunction with said tread surface, and said doublet pairs being spaced a sufficient distance from each other that when said tire tread is in rotation and said rib members are engaged with a ground plane surface said rib members will flex independently and out of contact with each other under load in one direction, and thus produce a movement of said tire tread relative to said ground plane surface in the opposite direction.

11. The construction defined in claim 10, and in which each rib member in a doublet pair is curved in opposed relationship to the other rib member of said pair.

12. The construction defined in claim 10, and in which each rib member in a doublet pair is straight, parallel to the other rib member of said pair, and transverse of said tread surface.

13. The construction defined in claim 10, and in which each rib member in a doublet pair is chevron shaped and in opposed relationship to the other rib member of said pair, forming a diamond pattern, transversely of said tread surface.

14. The construction defined in claim 10, and in which each said doublet pair of said rib members comprises two rib members criss-crossed and conjoined, and forming an X-pattern transversely of said tread surface.

15. The construction defined in claim 10, and in which each said doublet pair of said rib members comprises two rib members each provided with a medial notch forming an annular groove about said tread surface.

16. The construction defined in claim 10, and in which each said doublet pair of said rib members comprises two rib members each provided with parallel, aligned slits through said rib members and spaced transversely across from one side of said tread surface to the other, and forming a series of parallel, contiguous, independently flexible elements in each of said rib members.

References Cited in the file of this patent

UNITED STATES PATENTS

| | | |
|---|---|---|
| 2,084,784 | Stahl | June 22, 1937 |
| 2,109,691 | D'Ayguesvives | Mar. 1, 1938 |
| 2,403,309 | Smith | July 2, 1946 |
| 2,708,957 | Constantakis et al. | May 24, 1955 |
| 2,710,461 | Hack | June 14, 1955 |
| 2,833,057 | Hack | May 6, 1958 |

FOREIGN PATENTS

| | | |
|---|---|---|
| 42,436 | France | May 2, 1933 |